US010744496B2

(12) United States Patent
Chandler et al.

(10) Patent No.: US 10,744,496 B2
(45) Date of Patent: *Aug. 18, 2020

(54) CATALYST BINDERS FOR FILTER SUBSTRATES

(71) Applicant: Johnson Matthey Public Limited Company, London (GB)

(72) Inventors: Guy Chandler, Royston (GB); Keith Flanagan, Royston (GB); Alexander Green, Royston (GB); David Marvell, Royston (GB); Paul Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 26 days.

This patent is subject to a terminal disclaimer.

(21) Appl. No.: 15/655,933

(22) Filed: Jul. 21, 2017

(65) Prior Publication Data
US 2018/0021768 A1 Jan. 25, 2018

Related U.S. Application Data

(60) Provisional application No. 62/365,418, filed on Jul. 22, 2016.

(51) Int. Cl.
*B01J 29/06* (2006.01)
*B01J 35/04* (2006.01)
*B01J 29/072* (2006.01)
*B01D 53/00* (2006.01)
*B01J 29/76* (2006.01)
*B01J 37/03* (2006.01)
*B01J 21/04* (2006.01)
(Continued)

(52) U.S. Cl.
CPC .............. *B01J 35/04* (2013.01); *B01D 53/00* (2013.01); *B01D 53/944* (2013.01); *B01D 53/9418* (2013.01); *B01J 21/04* (2013.01); *B01J 29/061* (2013.01); *B01J 29/064* (2013.01); *B01J 29/068* (2013.01); *B01J 29/072* (2013.01); *B01J 29/076* (2013.01); *B01J 29/7015* (2013.01); *B01J 29/7049* (2013.01); *B01J 29/72* (2013.01); *B01J 29/723* (2013.01); *B01J 29/743* (2013.01); *B01J 29/76* (2013.01); *B01J 29/763* (2013.01); *B01J 29/783* (2013.01); *B01J 29/85* (2013.01); *B01J 35/0006* (2013.01); *B01J 35/023* (2013.01); *B01J 37/0246* (2013.01); *B01J 37/038* (2013.01); *B01J 37/30* (2013.01); *F01N 3/0222* (2013.01); *F01N 3/035* (2013.01); *F01N 3/2066* (2013.01); *B01D 2255/102* (2013.01); *B01D 2255/1021* (2013.01); *B01D 2255/1023* (2013.01); *B01D 2255/1025* (2013.01); *B01D 2255/1026* (2013.01); *B01D 2255/2065* (2013.01); *B01D 2255/20723* (2013.01); *B01D 2255/20738* (2013.01); *B01D 2255/20753* (2013.01); *B01D 2255/20761* (2013.01); *B01D 2255/50* (2013.01); *B01D 2255/9155* (2013.01); *B01D 2255/9202* (2013.01); *B01J 2229/18* (2013.01); *B01J 2229/186* (2013.01); *B01J 2229/26* (2013.01); *F01N 2370/02* (2013.01)

(58) Field of Classification Search
CPC ...... B01J 29/061; B01J 29/064; B01J 29/068; B01J 29/072; B01J 29/076; B01J 29/72; B01J 29/723; B01J 29/85; B01J 29/7015; B01J 29/7049; B01J 29/7065; B01J 29/743; B01J 29/763; B01J 29/783; B01J 2229/18; B01J 2229/186; B01J 2229/26; B01J 35/0006; B01J 35/04; B01J 35/023; B01J 37/038; B01J 37/0246; B01J 37/30; B01J 21/04; B01D 53/9418; B01D 2255/50; B01D 2255/9155; F01N 3/035; F01N 3/0222; F01N 3/02; F01N 3/2066
USPC ...... 502/63, 64, 65, 66, 69, 74, 439, 527.19; 422/177, 180
See application file for complete search history.

(56) References Cited

U.S. PATENT DOCUMENTS 8,535,629 B2* 9/2013 Ballinger ........... B01D 53/9418
423/213.2
2003/0115859 A1* 6/2003 Deeba ................ B01D 53/9431
60/297
(Continued)

FOREIGN PATENT DOCUMENTS

CN 105688980 A 6/2016
GB 2514266 A 11/2014

OTHER PUBLICATIONS

Agrafiotis et al., "The effect of particle size on the adhesion properties of oxide washcoats on cordierite honeycombs", Journal of Material Science Letters, 18, 1999, pp. 1421-1424.*
Mitra et al., "Washcoating of Different Zeolties on Cordierite Monoliths", J. Am. Ceram. Soc., 91, [1], 2008, pp. 64-70.*

Primary Examiner — Elizabeth D Wood
(74) Attorney, Agent, or Firm — Yuanzhang Han

(57) ABSTRACT

Provided is a catalyst washcoat comprising (i) a molecular sieve loaded with about 1 to about 10 weight percent of at least non-aluminum promoter metal (wherein the promoter metal weight percent is based on the weight of the molecular sieve); and (ii) about 1 to about 30 weight percent of a binder having a d90 particle size of less than 10 microns (wherein the binder weight percent is based on the total weight of the washcoat). In another aspect of the invention, the catalyst washcoat is applied to a wall-flow filter to form a catalyst article. In another aspect of the invention the catalyst article is part of an exhaust gas treatment system. And in yet another aspect of the invention, provided is a method for treating exhaust gas using the catalyst article.

13 Claims, 2 Drawing Sheets

(51) Int. Cl.
| | |
|---|---|
| *B01D 53/94* | (2006.01) |
| *B01J 29/068* | (2006.01) |
| *B01J 29/74* | (2006.01) |
| *B01J 29/076* | (2006.01) |
| *B01J 29/70* | (2006.01) |
| *B01J 29/064* | (2006.01) |
| *B01J 29/78* | (2006.01) |
| *B01J 37/02* | (2006.01) |
| *B01J 35/00* | (2006.01) |
| *B01J 37/30* | (2006.01) |
| *B01J 29/72* | (2006.01) |
| *B01J 29/85* | (2006.01) |
| *B01J 35/02* | (2006.01) |
| *F01N 3/022* | (2006.01) |
| *F01N 3/035* | (2006.01) |
| *F01N 3/20* | (2006.01) |

(56) References Cited

U.S. PATENT DOCUMENTS

| | | | |
|---|---|---|---|
| 2010/0290963 A1* | 11/2010 | Andersen | B01D 53/9418 423/213.2 |
| 2011/0142737 A1 | 1/2011 | Seyler et al. | |
| 2011/0112853 A1 | 5/2011 | Tong et al. | |
| 2011/0305614 A1* | 12/2011 | Stiebels | B01D 53/9418 423/213.5 |
| 2012/0275977 A1* | 11/2012 | Chandler | B01D 53/9418 423/213.5 |
| 2014/0044630 A1 | 2/2014 | Swallow et al. | |
| 2014/0322113 A1 | 10/2014 | Blakeman et al. | |
| 2014/0356266 A1 | 12/2014 | Chen et al. | |
| 2015/0071851 A1 | 3/2015 | Mohanan et al. | |
| 2015/0202604 A1 | 7/2015 | Sumiya et al. | |
| 2016/0193594 A1 | 7/2016 | Arnold et al. | |

* cited by examiner

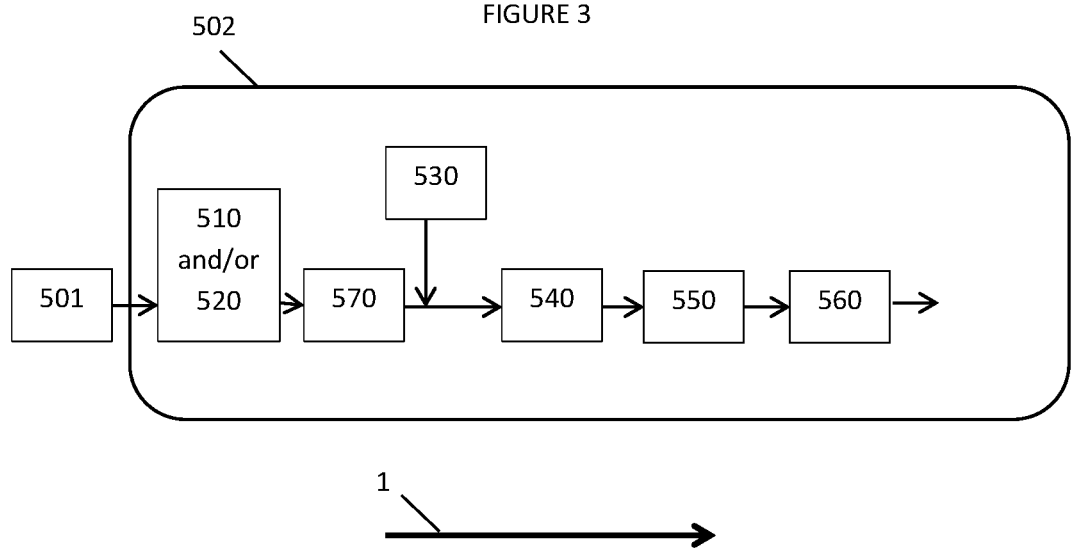

CATALYST BINDERS FOR FILTER SUBSTRATES

BACKGROUND

A.) Field of Use

The present invention relates to binders for improving adhesion of zeolite catalysts coated on wall-flow filters.

B.) Description of Related Art

When fuels such as natural gas, gasoline, diesel fuel, or coal are combusted in a chamber, the resulting exhaust gas is discharged into the atmosphere through an exhaust pipe, flue gas stack, or the like. Generally, most exhaust gas contains large amounts of relatively benign nitrogen ($N_2$), water vapor ($H_2O$), and carbon dioxide ($CO_2$); but typically also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). The production of soot and oxides of nitrogen ($NO_x$), which includes nitric oxide (NO), nitrogen dioxide ($NO_2$), and nitrous oxide ($N_2O$), is particularly problematic in lean burn engines, such as diesel engines for mobile applications. Therefore, it is desirable to eliminate these undesirable components from an exhaust gas, preferably by a process that does not generate other noxious or toxic substances in the process.

Zeolites and other molecular sieves having a promoter metal are known heterogeneous catalyst for treating exhaust gas, particularly by a selective catalytic reduction (SCR) process. When used in an exhaust system, zeolite-based SCR catalysts, in the form of a washcoat, are applied as a coating on a high surface area substrate, such as a flow-through honeycomb or wall-flow filter. The washcoat serves, in part, to disperse the catalyst materials over a large surface area. Catalyst washcoats typically include one or more binders, such as alumina, silica, titania, ceria, and zirconia. As used herein, the term "binder" refers to a material that facilitates adhesion of a catalytic washcoat, or components thereof, to each other and/or to a substrate.

The selection of a binder is dependent upon its intended purpose. Important considerations include interactions with the catalyst's surface, the surface chemistry of the substrate, the intended reaction conditions (temperature, moisture content, etc.) of the catalyst washcoat during normal or expected operations.

SUMMARY OF THE INVENTION

Applicants have unexpectedly found that certain metal oxide binders, such as alumina, having a d90 particle size range less than 10 microns enhances the performance of molecular sieve-based catalysts coated on honeycomb wall-flow filters. Performance improvements include better high temperature performance, better selectivity, reduced back-pressure, and/or improved high temperature thermal durability.

As used herein, the term "washcoat" means a composition containing both a catalyst component and a binder that is, or is designed to be, applied to a substrate. The washcoat can be in various forms including a slurry, suspension, or solution (prior to being applied to a substrate), or a coating on the surface and/or within the pores of a substrate. Other forms of a washcoat include coatings that have been dried and/or calcined. In general, the washcoat serves as a carrier for the catalyst component to facilitate application of the catalyst to the surface and/or the pores of a substrate.

Accordingly, provided is a catalyst washcoat comprising (i) a molecular sieve loaded with about 1 to about 10 weight percent of at least non-aluminum promoter metal (wherein the promoter metal weight percent is based on the weight of the molecular sieve); and (ii) about 1 to about 30 weight percent of a binder having a d90 particle size of less than 10 microns (wherein the binder weight percent is based on the total weight of the washcoat). In another aspect of the invention, the catalyst washcoat is applied to a wall-flow filter to form a catalyst article. In another aspect of the invention the catalyst article is part of an exhaust gas treatment system. And in yet another aspect of the invention, provided is a method for treating exhaust gas using the catalyst article.

BRIEF DESCRIPTION OF THE DRAWINGS

FIG. 3 is a diagram of a system containing a catalyzed wall-flow filter.

DETAILED DESCRIPTION OF PREFERRED EMBODIMENTS OF THE INVENTION

Figure 1:
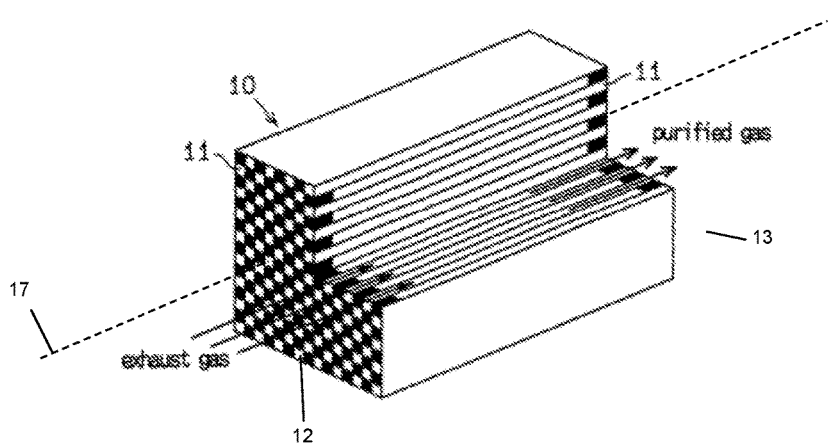
FIG. 1 shows a honeycomb wall-flow filter.

The present invention pertains to improved compositions, catalytic articles, and methods for reducing NOx and soot in an exhaust gas. Preferably, the NOx and soot reduction involves a catalytic washcoat applied to a honeycomb wall-flow filter substrate that is suitable for removing diesel particulate from an exhaust gas stream. Preferably, catalytic washcoat comprises a metal promoted molecular sieve and a binder that preferably enhances the molecular sieve's adhesion to the wall-flow filter substrate.

In certain preferred embodiments, molecular sieves for use in the present invention have a CHA, AEI, AFX, AFT, ERI, LEV, or KFI crystalline framework, as defined by International Zeolite Association. These include naturally occurring (i.e. mineral) and synthetic molecular sieves, but preferably are synthetic molecular sieves because the molecular sieves tend to have a more uniform silica-to-alumina ratio (SAR), crystallite size, and crystallite morphology, and have fewer and less concentrated impurities (e.g. alkaline earth metals). The distinction between natural and synthetic molecular sieves is not merely arbitrary, but reflects differences in the properties between the materials, which may in turn lead to differences in activity in the method of the present invention. Specific molecular sieves that are useful in the present application include, but are not limited to SSZ-13, SSZ-62, SSZ-39, SAPO-34 and SAPO-18. Other molecular sieves useful in the present invention are aluminosilicates having a framework structure of PAU, UFI, or DDR. Such molecular sieves are commercially available. A particularly preferred molecular sieve framework is CHA. An even more preferred molecular sieve framework is AEI.

Preferred aluminosilicate molecular sieves have a mole ratio of silica to alumina greater than about 8, more preferably from about 10 to about 50, such as from about 10 to about 20, and about 10 to about 15, and about 20 to about 25. The SAR of molecular sieves may be determined by conventional analysis. This ratio is meant to represent, as closely as possible, the silica-to-alumina ratio in the atomic framework of the molecular sieve crystal and preferably excludes aluminum in the binder or in cationic or other form within the channels. It will be appreciated that it may be extremely difficult to directly measure the silica to alumina ratio of molecular sieve after it has been combined with a binder material. Accordingly, the silica to alumina ratio has been expressed hereinabove in terms of the silica-to-alumina ratio of the parent molecular sieve, i.e., the molecular sieve used to prepare the catalyst, as measured prior to the incorporation of the molecular sieve into the washcoat.

Preferably, the molecular sieve is ion exchanged to incorporate one or more promoter metals into the molecular sieve. A promoter metal can be any non-aluminum, catalytically active metal that can be exchanged onto a molecular sieve material and/or incorporated into a molecular sieve framework and that is useful for catalytically reducing the concentration of undesirable components (e.g., CO, HC, NOx, NH3, soot) in automotive exhaust gas. In one embodiment, at least one promoter metal is used in conjunction with the molecular sieve to increase the catalyst's performance. As used herein, the term "metal-promoted molecular sieve" means a molecular sieve to which one or more metals other than aluminum has been added by ion exchange (i.e., a metal-exchanged molecular sieve), impregnation, isomorphous substitution, etc.

Metal-exchanged molecular sieves are distinct from metal-substituted molecular sieves in that the former does not incorporate the promoter metal into the molecular sieve framework per se, whereas the latter does incorporate the promoter metal directly into the molecular sieve framework. This distinction is not arbitrary, but represents an important difference in catalytic performance. The location of the metal within the molecular sieve impacts its availability as a catalytically active site.

Promoter metals include precious metals, such as gold and silver, platinum group metals (PGMs) such as palladium (Pd), platinum (Pt), rhodium (Rh), and ruthenium (Ru), and transition metals such as copper (Cu), nickel (Ni), zinc (Zn), iron (Fe), tin (Sn), tungsten (W), molybdenum (Mo), cobalt (Co), bismuth (Bi), titanium (Ti), zirconium (Zr), antimony (Sb), manganese (Mn), chromium (Cr), vanadium (V), niobium (Nb), as well as combinations of two or more of these. Preferred promoter metals include Cu, Fe, Pd, Pt, V, Ce, Nb, Ru, Rh, Mo, and Mn. A particularly preferred promoter metal is Cu. Another particularly preferred promoter metal is Fe. Yet another particularly preferred promoter metal is Pd. In addition, other metals may be used in conjunction with the promoter metal, including calcium and rare earth metals, particularly cerium, neodymium, europium, and gadolinium.

In certain embodiments, the molecular sieve and/or washcoat is free or substantially free of any promoter metal other than transition metals. In certain embodiments, the molecular sieve and/or washcoat is free or substantially free of any promoter metal other than PGMs. In certain embodiments, the molecular sieve and/or washcoat is free or substantially free of any rare earth metal. In certain embodiments, the molecular sieve and/or washcoat is free or substantially free of any PGMs. In certain embodiments, the molecular sieve and/or washcoat is free or substantially free of any non-aluminum transition metal other than copper. In certain embodiments, the molecular sieve and/or washcoat is free or substantially free of any non-aluminum transition metal other than iron. As used herein, the term "substantially free" means that if the metal is present in the catalyst composition, it is present at a concentration that would change the catalyst's desired catalytic conversion performance by less than 1% relative to a catalyst without the metal or that the metal is present in an amount less than 0.1 weight percent based on the total weight of the molecular sieve.

In one example, a metal-exchanged molecular sieve is formed by blending the molecular sieve into a solution containing soluble precursors of the catalytically active metal. The pH of the solution may be adjusted, for example, by the addition of ammonium hydroxide to induce precipitation of the catalytically active cations onto or within the molecular sieve structure. For example, in a chabazite is immersed in a solution containing copper nitrate for a time sufficient to allow incorporation of the catalytically active copper cations into the molecular sieve structure by ion exchange and then ammonium hydroxide is added to incorporate un-exchanged copper ions in the solution into the molecular sieve structure by precipitation. The metal-promoted molecular sieve may then be washed, dried and calcined. When iron or copper is used as the metal cation, the metal content of the catalytic material by weight (relative to the molecular sieve material) preferably comprises from about 0.1 to about 10 percent by weight percent, such as about 1 to about 6 weight percent, about 0.5 to about 1 weight percent, and preferably about 2.5 to about 5 weight percent.

The resulting catalytic molecular sieve material can be dried at about 100 to 120° overnight and calcined at a temperature of at least about 550° C.

Aluminosilicate molecular sieves with application in the present invention can include those that have been treated to improve hydrothermal stability. Conventional methods of improving hydrothermal stability include: (i) de-alumination by steaming and acid extraction using an acid or complexing agent e.g. (EDTA—ethylenediaminetetracetic acid); treatment with acid and/or complexing agent; treatment with a gaseous stream of $SiCl_4$ (replaces Al in the molecular sieve framework with Si); and (ii) cation exchange—use of multivalent cations such as La.

The binder can be alumina, silica, non-zeolite silica-alumina, ceria, ceria-zirconia, titania, and mixtures thereof. Alumina is preferred and can be of several crystalline structures, including alpha ($\alpha$), beta ($\beta$), gamma ($\gamma$), delta ($\delta$), eta ($\eta$), theta ($\theta$), and chi ($\chi$) alumina, with gamma alumina and theta alumina being the most preferred. Preferably, the binder has a specific surface area greater than about 100 m$^2$/g, such as greater than about 200 m$^2$/g, or is in the range of about 100-400 m$^2$/g. In certain embodiments, the binder has mean pore size of greater than about 10 Å, such as greater than about 20 Å.

Preferably, the alumina binder will have a d90 particle size of less than 10 microns, more preferably less than 5 microns, and even more preferably less than 1 micron, particularly when dispersed. Preferably, the d90 particle size is less than about 10 and greater than about 0.1 microns, preferably between about 0.1 and about 1.0 microns. Here, the term "d90" means that 90 weight percent of the binder particles have a particle size of less than the specified value. Particle size can be measured as the length of a particle or diameter of the particle. When measuring the diameter, a particle can be approximated as an equivalent sphere based on equivalent volume. The d90 particle size can be determined using any conventional means suitable for measuring alumina particles of the type used in binders. Examples of measuring techniques include laser diffraction and image analysis. Although different measurement techniques may result is slightly different values for a d90 particle size, all conventional techniques are considered with the scope of the present invention.

In addition to the mean particle size, the particle size distribution of the alumina is preferably small, such that a sample of particles has a variance about the mean of one or less. In certain embodiments the binder has a mean crystalline size of about 5 to 150 nm and/or a mean disperse particle size of about 15 microns to about 500 nm, and/or a mean dispersed particle size with a relative standard deviation of not more than 50%.

The typical amount of binder present is from about 1 to about 35 weight percent, preferably from about 5 to about 25 weight percent, even more preferably from about 10 to about 20 weight percent based on the weight of the washcoat.

In one example, a catalytic washcoat is formed by blending the metal-promoted molecular sieve, preferably a copper- or iron-exchanged molecular sieve, with a binder, preferably consisting essentially of alumina, to form a slurry, preferably an aqueous slurry. In certain embodiments, the alumina binder immobilizes Cu or Fe in the washcoat to prevent it from interacting with the framework alumina of the molecular sieve.

In certain embodiments, the washcoat further comprises one or more stabilizers, such as rare earth metals including lanthanum, pore forming agents, or the addition of Ce and/or Ca for thermodurability at temperatures up to 900° C. In certain embodiments, the washcoat is substantially free of substances imparting catalytic activity for NOx abatement other than metal exchanged molecular sieves. In certain embodiments, the washcoat is substantially free of lanthanum or other rare earth stabilizers.

In certain embodiments, the catalytic washcoat is applied to a substrate. Preferred substrates for use in mobile application are monoliths having a so-called honeycomb geometry which comprises a plurality of adjacent, parallel channels, each channel typically having a square, round, hexagonal, or triangular cross-sectional. Other substrates include sheets or screens that can be layer in any suitable fashion including, for example, stacking, rolling, or arraying about a central axis.

The honeycomb shape provides a large catalytic surface with minimal overall size and pressure drop. The molecular sieve catalyst can be deposited on a flow-through monolith substrate (e.g., a honeycomb monolithic catalyst support structure with many small, parallel channels running axially through the entire part) or filter monolith substrate such as a wall-flow filter, etc. In another embodiment, the molecular sieve catalyst is formed into an extruded-type catalyst. Preferably, the molecular sieve catalyst is coated on a substrate in an amount sufficient to reduce the NOx contained in an exhaust gas stream flowing through the substrate.

The substrate is preferably constructed of one or more materials that include, as a predominant phase, aluminum titanate, cordierite, silicon carbide, silicon nitride, zirconia, mullite, alumina-silica-magnesia, zirconium silicate, ceramic fiber composite, with aluminum titanate being particularly preferred. The filter can be passivated or unpassivated.

The catalytic articles and exhaust gas treatment systems of the present invention can be used to reduce the particulate matter in an exhaust gas stream. Preferred filter substrates include diesel particulate filters, and more preferably diesel particulate filters for use in mobile applications. In addition to cordierite, silicon carbide, and ceramic, other materials that can be used for the porous substrate include, but are not limited to, alumina silica, aluminum nitride, silicon nitride, aluminum titanate, $\alpha$-alumina, mullite, pollucite, zircon, zirconia, spinel, borides, feldspar, titania, fused silica, borides, ceramic fiber composites, mixtures of any of these, or composites comprising segments of any two or more thereof. Particularly preferred substrate include cordierite, silicon carbide, and aluminum titanate (AT) where AT is the predominate crystalline phase.

Wall-flow filter substrates for diesel engines typically contain about 100-800 cpsi (channels per square inch), for example about 100 to about 400 cpsi, about 200 to about 300 cpsi, or about 500 to about 600 cps. In certain embodiments, the walls have an average wall thickness of about 0.1 to about 1.5 mm, for example about 0.15 to about 0.25 mm, about 0.25 to about 0.35 mm, or about 0.25 to about 0.50 mm.

Wall flow filters for use with the present invention preferably have an efficiency of at least 70%, at least about 75%, at least about 80%, or at least about 90%. In certain embodiments, the efficiency will preferably be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

The filter's useful range of porosity and mean pore size are not particularly limited but are correlated to, or are used to determine, the particle size and viscosity of the catalyst coating. As described herein, the filter substrate's porosity and mean pore size are determined based on a bare filter (e.g., without a catalyst coating). In general, the porosity of the substrate is at least about 40%, more preferably at least about 50%, for example about 50 to about 80%, about 50 to about 70%, or about 55 to about 65%. Porosity can be measured by any suitable means, including mercury porosimetry. In general, the mean pore size of the substrate is about 8 to about 40 µm, for example about 8 to about 12 µm, about 12 to about 20 µm, or about 15 to about 25 µm. In certain embodiments, at least about 50%, and more preferably at least about 75% of the pores are within these ranges, based on the total pore volume and/or total number of pores. Mean pore size can be determined by any acceptable means, including by mercury porosimetry. In certain embodiments, the filter substrate has a mean pore size of about 12 to about 15 µm and a porosity of about 50 to about 55%. In preferred embodiments, the filter substrate has a mean pore size of about 18 to about 20 µm and a porosity of about 55 to about 65%.

Manufacturing the honeycomb wall-flow filter can involve fabrication of extruded walls which are then fired. After firing, alternating channel openings are suitably sealed with plug material to provide the structure described hereinabove. Alternatively, the extruded walls can sealed with a rear plug material before being fired. The plug material should be compatible with the porous wall material, exhibit good physical and chemical stability, and provide a stable, well-bonded and long-term seal with the porous walls.

When too much soot accumulates on the filter, the filter must be regenerated, either passively or actively. Regeneration occurs by oxidizing soot that has accumulated on the filter. As used herein, the terms "soot" and diesel particulate matter" are used interchangeably. Failure to regenerate the filter on a regular basis will cause an increase in accumulated soot leading to a pressure drop across the filter to increase to unacceptable levels.

In passive regeneration, the soot oxidation temperature is lowered to a level allowing for auto-regeneration during regular vehicle operation—a task commonly achieved by catalytic activity. The catalyst on the filter can promote oxidation of carbon through two mechanisms: catalytic oxidation of carbon by oxygen, or catalytic oxidation of NO to $NO_2$, followed by the oxidation of carbon by nitrogen dioxide. Active regeneration involves raising the temperature of soot trapped in the filter through the use of an outside energy source, such as the combustion of fuel injected directly into the exhaust gas stream or by engine management methods. Another source of outside energy is electricity provided by heating elements. A combination of active and passive regeneration can also be used.

Filter regeneration can involve temperature of greater than 650 deg. C., for example 650-950 deg. C., 750-900 deg. C., or 800-900 deg. C. The selection of binder in combination with the metal-promoted molecular sieve of the present invention unexpectedly results in higher thermal stability (i.e., the ability of the catalyst to withstand high temperatures without irreversible degradation) and/or improved catalytic conversion at higher temperatures compared to similar catalyst using binders with a d90 particle size greater than 10 microns or a d90 particle size greater than 5 microns.

Preferably, the application of a catalytic washcoat described herein to a wall-flow filter does not substantially increase the back pressure of the filter compared to a bare-filter. In certain embodiments, the catalytic article described herein achieves a back pressure that is within 15%, more preferably within 10%, of the backpressure of a similar bare filter under similar operating conditions (e.g., space velocity and soot loading). In certain embodiments, the catalytic article described herein achieves a backpressure that is less than, preferably at least 5% less than or at least 10% less than, the back pressure achieved by a similar wall-flow filter having a similar catalyst and washcoat loading, except that the similar catalyst contains a binder have a d90 particle size greater than 10 microns or a d90 particle size greater than 5 microns. As used herein, the term "backpressure" means the exhaust gas pressure drop across the catalyzed filter.

Limiting back pressure is an important feature of catalyzed filters in exhaust systems. At increased back pressure levels, the engine has to compress the exhaust gases to a higher pressure which involves additional mechanical work and/or less energy extracted by the exhaust turbine which can affect intake manifold boost pressure. This can lead to an increase in fuel consumption, PM and CO emissions and exhaust temperature.

In addition to diesel particulate removal, the catalyst article described herein is also effective at reducing $NO_x$ and/or $NH_3$ in an exhaust system either by trapping/adsorbing the $NO_x$ or selectively catalytically reducing the $NO_x$ into $N_2$ and $H_2O$ with the use of a reductant. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst comprise the metal containing molecular sieve described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst.

The reductant (also known as a reducing agent) for SCR processes broadly means any compound that promotes the reduction of NOx in an exhaust gas. Examples of reductants useful in the present invention include ammonia, hydrazine or any suitable ammonia precursor, such as urea $((NH_2)_2CO)$, ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

According to another aspect of the invention, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, the nitrogen oxides are reduced with the reducing agent at a temperature from about 150 to 750° C. In a particular embodiment, the temperature range is from 175 to 650° C. In another embodiment, the temperature range is from 175 to 550° C. In yet another embodiment, the temperature range is 450 to 750° C., preferably 450 to 700° C., 450 to 650° C., Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the molecular sieve catalyst for use in the present invention is located downstream of the filter.

In another embodiment, the nitrogen oxides reduction is carried out in the presence of oxygen. In an alternative embodiment, the nitrogen oxides reduction is carried out in the absence of oxygen.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, coffee roasting plants etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a molecular sieve catalyst described herein. The system can include means, when in use, for controlling the metering means so that nitrogenous reductant is metered into the flowing exhaust gas only when it is determined that the molecular sieve catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR molecular sieve catalyst having a ratio of NO to $NO_2$ of from about 4:1 to about 1:3 by volume, e.g. at an exhaust gas temperature at oxidation catalyst inlet of 250 to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a molecular sieve such as an aluminosilicate molecular sieve, silica, non-zeolite silica alumina, ceria, zirconia, titania or a mixed or composite oxide containing both ceria and zirconia.

In a further embodiment, the molecular sieve catalyst for use in the present invention is coated on a filter located downstream of the oxidation catalyst. Where the filter includes the molecular sieve catalyst for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

Figure 2:
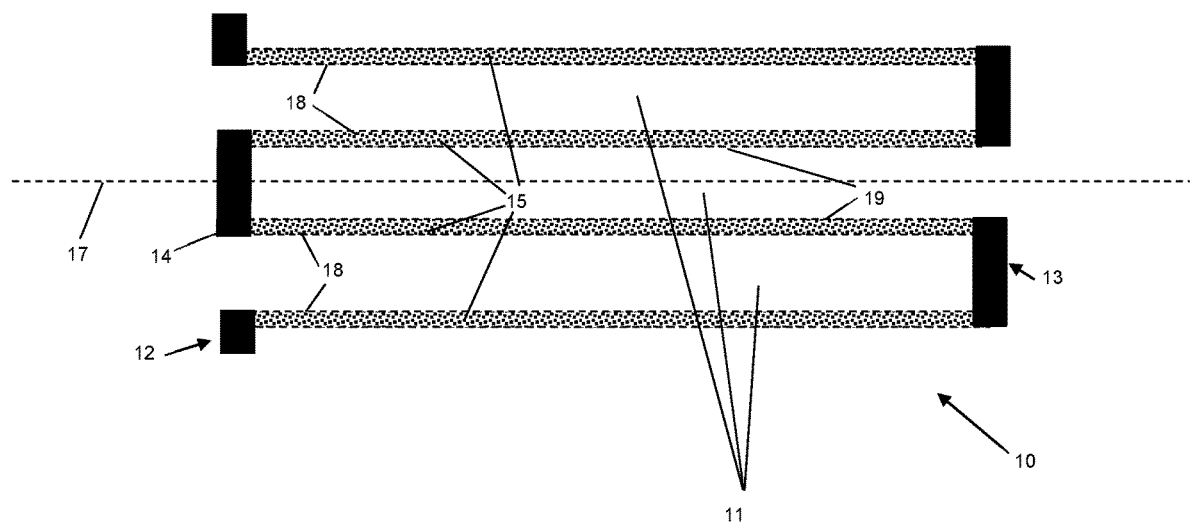
FIG. 2 is a cross-sectional diagram showing an embodiment of the invention wherein a catalyst washcoat is applied to a honeycomb wall-flow filter.

Turning to FIGS. 1 and 2, shown are views of a portion of a wall-flow filter substrate 10 for use in vehicular exhaust systems. The wall-flow substrate has multiple channels 11 that are approximately parallel to one another and that extend from front face 12 to rear face 13 of the filter along an axis 17 of gas flow through the substrate (i.e., the direction 28 of exhaust gas entering and purified gas exiting). Wall-flow filter substrates for diesel engines may contain 400-800 channels, but for simplicity only a few channels are shown in these Figures. The channels are defined by porous walls containing the catalytic washcoat 15. The porous walls have an upstream side 18 and a downstream side 19, relative to the direction of gas flow through the walls. The catalyst washcoat can be a surface coating on all or a portion of the upstream side of the porous wall, a surface coating on all or a portion of the downstream side of the porous wall, completely or partially within the porous wall, or some combination of two or more of these.

Approximately half of the channels have front plugs 14 at the front of the filter and the other half of the channels have rear plugs 16 at rear of the filter. With this arrangement, the exhaust gas cannot flow directly through a given inlet channel but is forced to flow through the separating porous walls into an adjacent outlet channel. The exhaust gas is thus filtered as it flows through the porous walls between adjacent channels.

Turning to FIG. 10, shown is an exhaust gas treatment system comprising an internal combustion engine 501, an exhaust gas treatment system 502, a direction of exhaust gas flow through the system 1, an optional diesel oxidation catalyst (DOC) 510 and/or an optional NOx adsorbtion catalyst (NAC) or lean NOx trap (LNT) 520, an optional diesel exotherm catalyst (DEC) 570, a wall-flow filter containing a catalytic washcoat described herein 540, an optional external source of ammonia and injector 530, an optional additional SCR catalyst 550, and an optional ammonia slip catalyst (ASC) 560.

What is claimed is:
1. A catalytic article:
   a. a honeycomb wall-flow filter having porous walls;
   b. a catalyst washcoat disposed on and/or within at least a portion of the porous walls,
      wherein the catalyst washcoat comprises (i) a molecular sieve having about 1 to about 10 weight percent of at least one non-aluminum promoter metal, based on the total weight of the molecular sieve; and (ii) about 1 to about 30 weight percent of a binder having a d90 particle size of less than 10 microns, based on the total weight of the washcoat,
      wherein said molecular sieve is an aluminosilicate having a framework selected from the group consisting of CHA, AEI, AFX, AFT, ERI, LEV, or KFI and said at least one non-aluminum promoter metal is selected from the group consisting of Cu, Fe, V, Ce, Pt, Pd, Ru, Rh, and Ni, wherein the promoter is useful for catalytically reducing undesirables in the automotive exhaust gas, and
      the particle size distribution of the binder has a variance about the mean of one or less.

2. The catalyst article of claim 1, wherein the d90 particle size is less than 5 microns.

3. The catalyst article of claim 1, wherein the d90 particle size is greater than 1 micron.

4. The catalyst article of claim 1, wherein the binder is selected from the group consisting alumina, silica, ceria, titania, zirconia, or combinations of two or more of these.

5. The catalyst article of claim 1, wherein the binder is alumina.

6. The catalyst article of claim 5, wherein the alumina is selected from gamma-alumina and theta alumina.

7. The catalyst article of claim 1, wherein the honeycomb wall-flow filter is a ceramic monolith.

8. The catalyst article of claim 1, wherein the filter is constructed of aluminum titanate, cordierite, silicon carbide, silicon nitride, zirconia, mullite, alumina-silica-magnesia, zirconium silicate, ceramic fiber composite, wherein the filter is passivated or unpassivated.

9. The catalyst article of claim 1, wherein the molecular sieve has a silica-to-alumina ratio (SAR) of about 10 to about 50.

10. The catalyst article of claim 9, wherein the framework is AEI.

11. The catalyst article of claim 10, wherein the SAR is about 10 to about 20.

12. The catalyst article of claim 1, wherein the promoter metal is Cu, Fe or Pd.

13. The catalyst article of claim 1, wherein the binder has:
(a) a mean crystalline size of about 5 to 150 nm and/or
(b) a mean disperse particle size of about 15 microns to about 500 nm, and/or
(c) a mean dispersed particle size with a relative standard deviation of not more than 50%.

* * * * *